May 21, 1929.  A. C. VAUGHAN  1,713,572
COTTON PICKING MACHINE
Filed Sept. 27, 1921  4 Sheets-Sheet 1
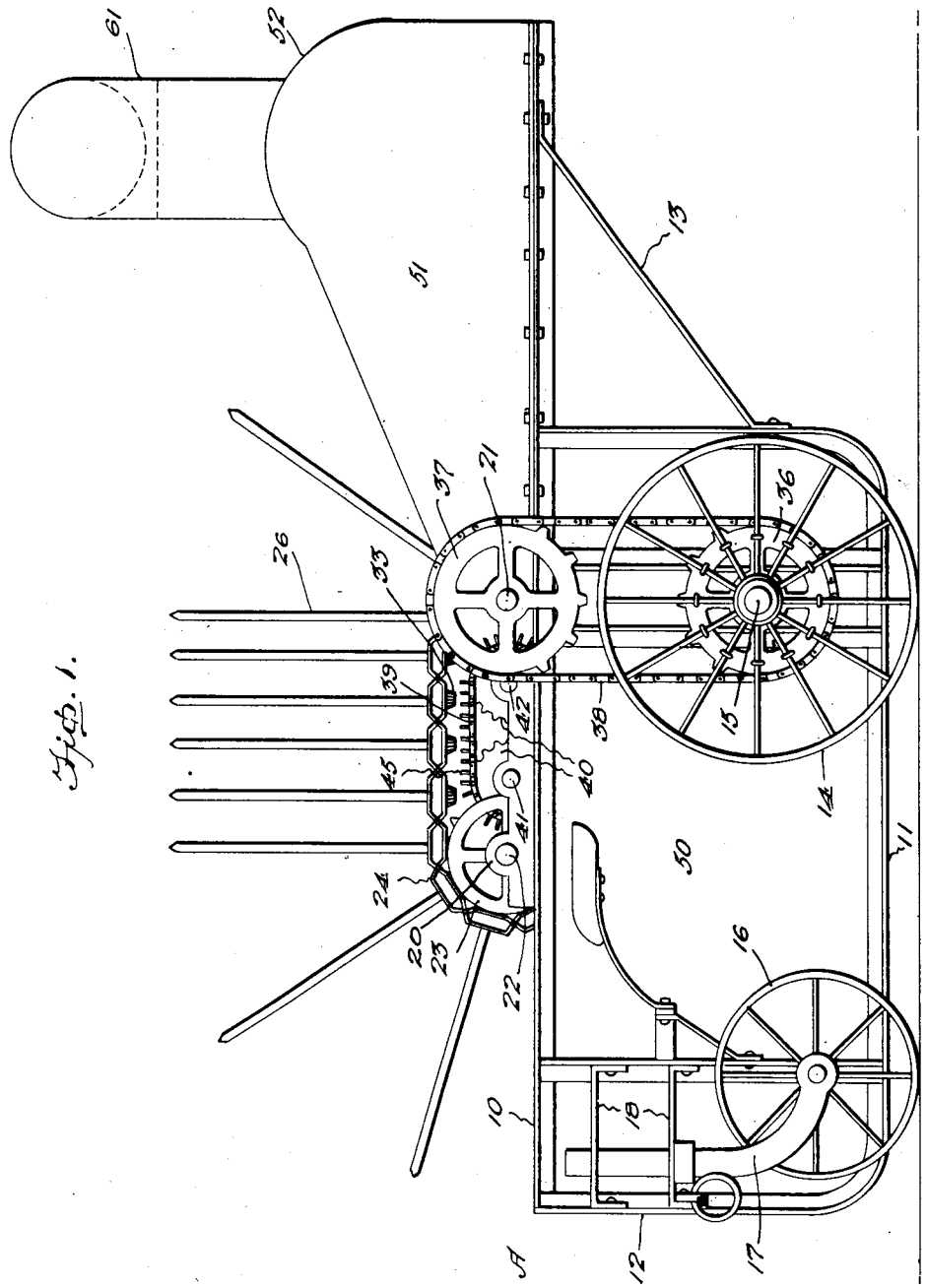

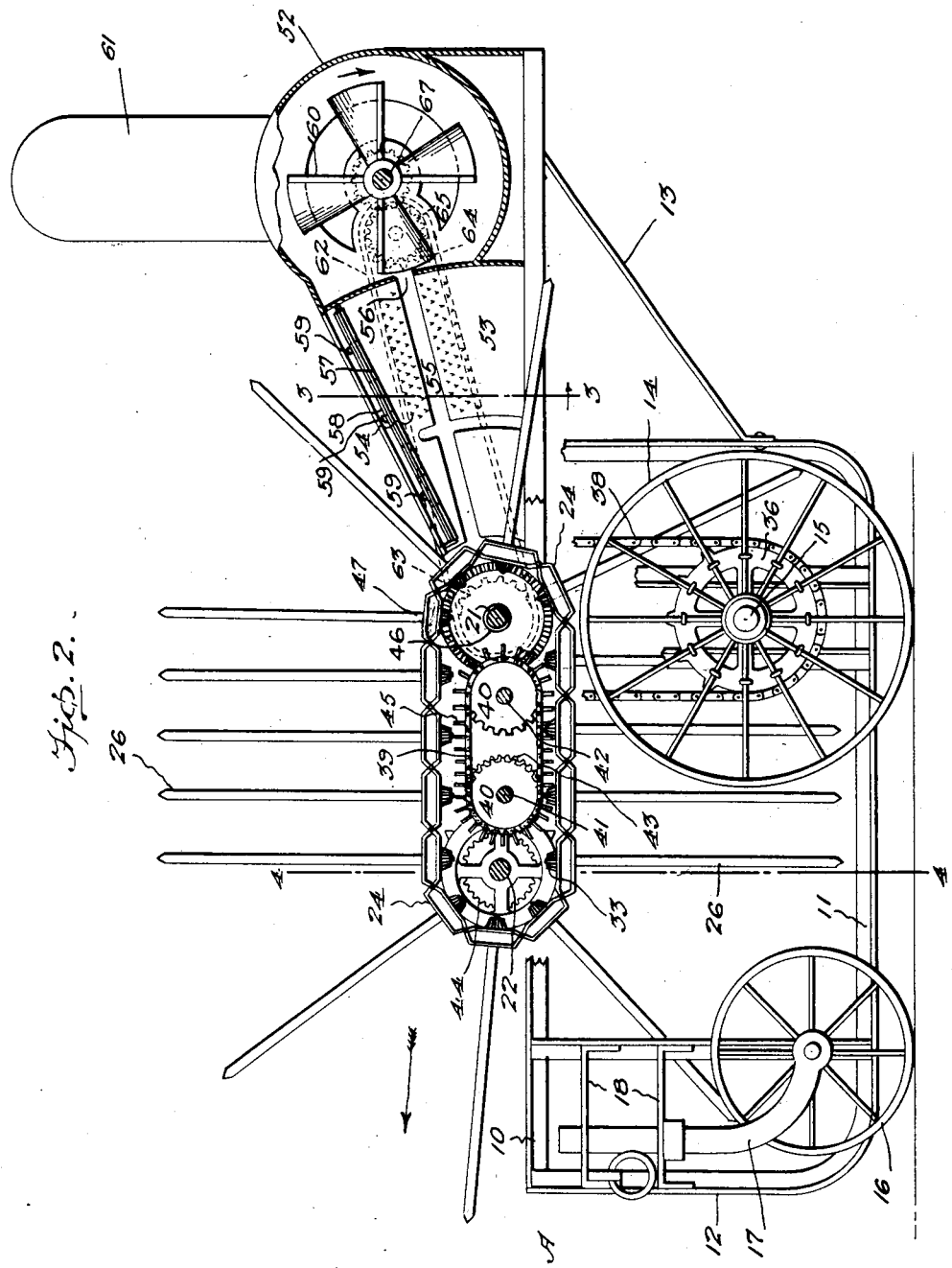

May 21, 1929.   A. C. VAUGHAN   1,713,572
COTTON PICKING MACHINE
Filed Sept. 27, 1921   4 Sheets-Sheet 3
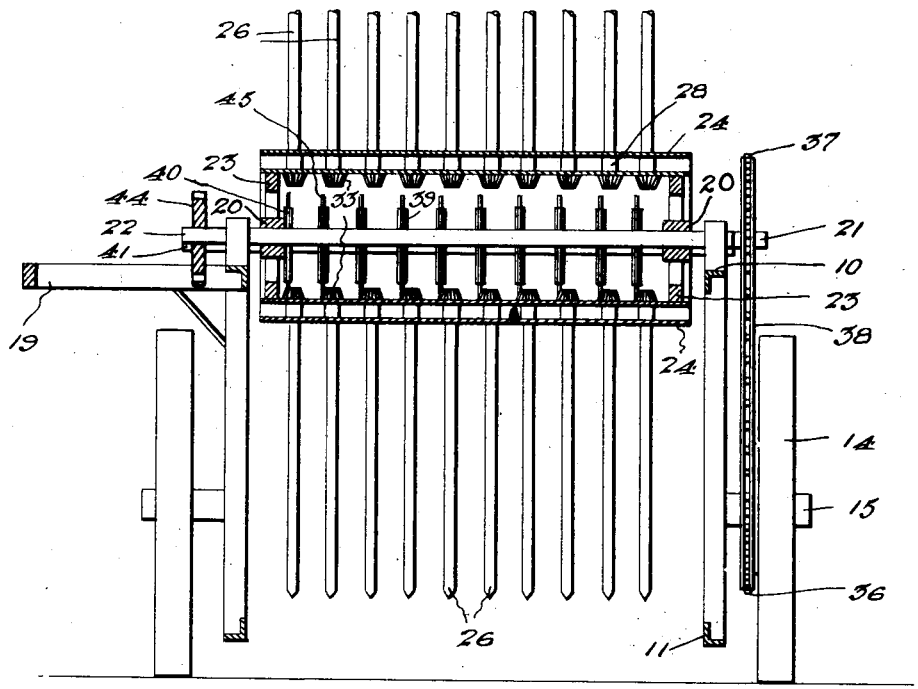
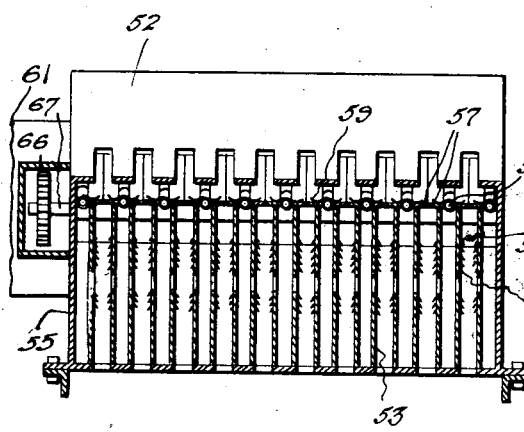
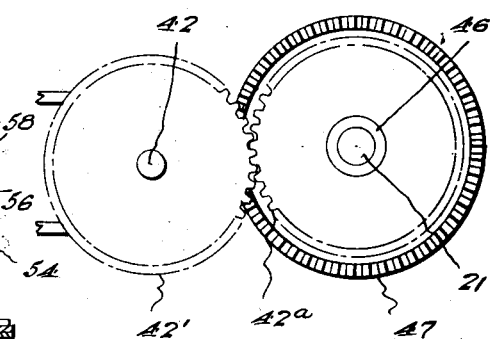

May 21, 1929.  A. C. VAUGHAN  1,713,572
COTTON PICKING MACHINE
Filed Sept. 27, 1921  4 Sheets-Sheet 4
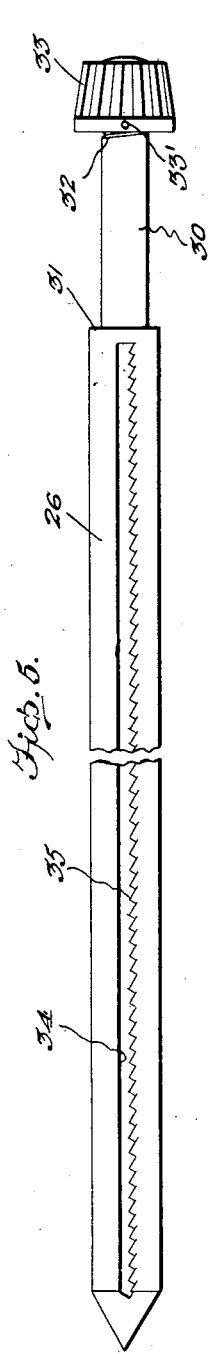
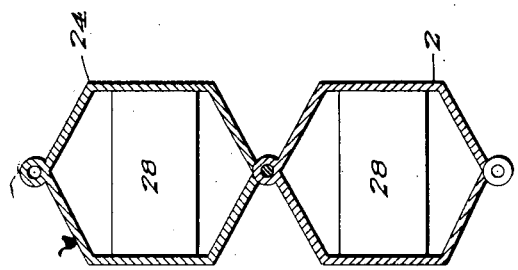
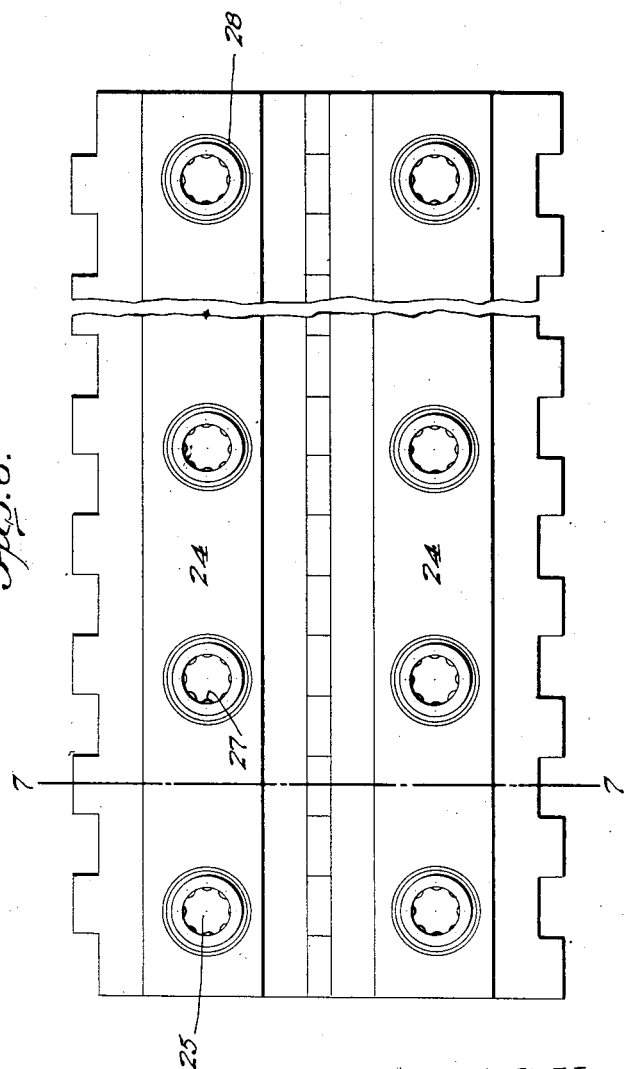

Patented May 21, 1929.

1,713,572

UNITED STATES PATENT OFFICE.

AMOS CLATEN VAUGHAN, OF ANADARKO, OKLAHOMA.

COTTON-PICKING MACHINE.

Application filed September 27, 1921. Serial No. 503,477.

This invention comprehends the provision of a cotton picking machine, wherein spaced series of spindles are mounted on an endless conveyor and walked through the rows of cotton, the spindles being rotated in one direction when passing between the rows and designed to remove the cotton from the bolls, and adapted to be rotated in a reversed direction to facilitate separating of the cotton from the spindles as they pass through a stripping mechanism.

One of the chief characteristics of the invention resides in the novel form of mechanism for stripping the cotton from the above mentioned spindles and conveying the said cotton by suction through a delivery tube to its proper destination.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:—

Figure 1—is a side elevation of the machine constructed in accordance with my invention.

Figure 2—is a similar view, showing the sides of the machine removed, this view being partly in section and showing the manner in which the spindles are rotated in reverse directions.

Figure 3—is a transverse sectional view taken on line 3—3 of Figure 2.

Figure 4—is a similar view taken on line 4—4 of Figure 2.

Figure 5 is an enlarged fragmentary view of one of the spindles.

Figure 6—is an enlarged plan view of a portion of the endless conveyor upon which the spindles are mounted.

Figure 7—is a sectional view taken on line 7—7 of Figure 6.

Figure 8 is a fragmentary view of a means for rotating the spindles.

Referring to the drawings in detail, A indicates the frame of the machine which travels in the direction of the arrow as indicated in Fig. 2. The frame is preferably made up of spaced parallel side members 10 which are connected to similar members 11 by means of the end members 12. The frame may be of any suitable construction however, and suitably braced as at 13. The traction wheels 14 are mounted on stub axles 15, while the front wheels 16 are journaled in castor-like members 17 which are operatively associated with brackets 18. The frame extends an appreciable distance beyond the rear end members 12 to support the stripping mechanism. An auxiliary frame 19 extends laterally from one side of the main frame, so that two of such machines may be connected together side by side, or one machine connected to a wagon of the like which receives the cotton from the stripping mechanism.

Journaled in suitable bearings 20 are spaced parallel shafts 21 and 22 respectively. Each of these shafts support a plurality of sprockets 23, and supported and driven by the sprockets 23 is an endless belt or the like 24. The belt 24 is made up of a plurality of hingedly connected units, preferably constructed of metal and of hollow formation as clearly illustrated in Figure 7. The outer side of each unit is provided with a plurality of openings 25 for the reception of the spindles 26. Obviously, there is one of such openings 25 for each spindle, and each unit of the belt carries a series of spaced parallel spindles as illustrated. If desired, the openings 25 in each unit may be equipped with roller bearings as illustrated at 27 in Figure 6. Each unit 24 of the belt is preferably, although not necessarily equipped with a cylindrical reinforcing member 28 arranged to connect the opposed sides of each unit and surrounding the openings 25, therefore affording the unit proper strength and rigidity, and eliminating all possibility of walls collapsing.

Each spindle 26 is reduced at one end as at 30 and passed through the opening 25 above referred to, the reduced portion defining a shoulder 31 which reposes upon the belt. The reduced portion 30 is threaded at one end as at 32 to accommodate a gear 33 which is of course threaded onto the spindle and passing through the gear and threaded end of the reduced portion is a pin 33' for locking the gear in operative position. Each spindle is also provided with a longitudinal groove 34 with milled teeth 35 constituting one edge of the groove, the construction being such that when the spindles are rotated they effectively take hold of the cotton, twisting the latter around the spindle incident to drawing it away from the boll. The endless belt may be actuated in any suitable manner, but I preferably equip one of the traction wheels 14 with a sprocket 36 over which and a sprocket 37 mounted on the shaft 21 is trained an endless chain 38. Consequently, as the endless belt is actuated, each series of spaced parallel spindles are gradually moved through the rows of cotton in true vertical positions, and separates the cotton from the bolls without injuring the growing cotton.

For the purpose of rotating the spindles 26 in one direction, while passing through the rows of cotton, I make use of an endless chain 39, this chain being trained over sprockets 40 which are keyed upon the spaced parallel shafts 41 and 42 respectively. The chain 39 is moved through the instrumentality of the shaft 41, which in turn is rotated by means of a gear 43 fixed upon the shaft 41 and meshing with a gear 44 carried by the shaft 22. The chain 39 is provided with teeth 45 which engage the gears 33 of the spindles 26, when these spindles pass through the cotton rows, thereby rotating the spindles for the purpose above stated. In practice, if it is necessary to obviate lateral play in the free lengths of the chains 39, so that the teeth 45 will properly mesh with the teeth of gears 33 on the spindles, any appropriate means which will be deemed within the skill of a mechanic skilled in this art, may be resorted to. After the spindles have passed through the cotton rows, and approach the stripping mechanism, hereinafter fully described, the rotation of the spindles is reversed to facilitate the separation of the cotton from the spindles. For this purpose, the shaft 21 is equipped with a sleeve 46 and on which sleeve is mounted a plurality of gears 47 with which the gears 33 of the spindles mesh after they leave the teeth 45 of the chain 39. The shaft 42 is equipped with a cog wheel 42' as shown in Figure 8, which wheel meshes with a similar wheel 42$^a$ fixed to sleeve 46 to provide for the reverse motion of the spindles. Consequently, the rotation of the spindles is then reversed as they approach the stripping mechanism. The chains do not engage the gears 47.

The frame A supports side walls 50, while the extension of the frame supported by the brace bars 13 supports the spaced parallel walls 51 defining a chamber within which the stripping mechanism is arranged. The walls 51 are connected with the fan drum providing the suction chamber 52. The stripping mechanism includes a plurality of plates 53, preferably constructed from metal, the plates being arranged vertically and secured at one end to the drum 52. These plates are arranged in the path of the spindles 26, or in other words, are so disposed that the spindles pass between them. The spindles are rotated while passing between the plates, and the cotton is unwound from the spindle by friction, as also by the studs or pins 54 projecting from each plate as shown. The stripping chamber is formed by the side walls 55 and provided with a longitudinal opening 56 communicating with the suction chamber or drum 52, so that the cotton separated from the spindles is sucked or conveyed through the stripping chamber into the drum as will be readily apparent. Arranged above the plates 53 is a shutter 57 hinged as at 58, the shutter being normally held in its closed position by means of springs 59. The shutter is arranged to prevent ingress of air from above the stripping mechanism, thus confining the passage to the lower entrance of the stripper. When the spindles pass between the plates, they come in contact with the shutter lifting the latter, and pass out of the stripper mechanism, after which the shutter is immediately closed by means of the springs above mentioned. Manifestly, as a cotton laden spindle enters the stripping chamber from the bottom thereof, its disposition with respect to the plates is such that it practically closes the draft, so that the suction from the drum 52 will be more effective upon the cotton, drawing the latter from the chamber into the drum. The shutter closing the air passage above the chamber confines the line of suction to the lower entrance, thus utilizing all the power of the suction to clean the spindle. Moreover, when the spindle lifts the shutter as it passes from the stripping chamber, it is obvious that the in-rushing air will sweep back any cotton that remains on the spindle or in the passage above the opening in the suction chamber. A fan 60 rotates within the drum 52, while leading from the drum is a discharge spout 61 which conveys the cotton from the drum to a wagon or any other suitable receptacle associated with the machine.

The fan 60 may be rotated in any suitable manner, but I preferably make use of an endless chain 62, trained over a sprocket 63 carried by the shaft 21, and a sprocket 64 mounted adjacent the drum 52. Associated with the sprocket 64 is a toothed wheel 65 meshing with a smaller toothed wheel 66 carried by the fan shaft 67, so that the fan is rotated with the proper degree of speed incident to the movement of the machine over the ground or surface.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

1. In a cotton picking machine, a wheeled frame, an endless belt mounted thereon, means for operating said belt, spaced series of cotton picking spindles projecting from said belt and adapted to pass through rows of cotton, means for rotating the spindles in one direction when passing through the rows, stripping mechanism including a stripping chamber, spaced parallel plates arranged within the stripping chamber and between which the spindles pass, studs projecting from each plate, a suction chamber communicating with the stripping chamber, a fan operating in said suction chamber, and means for reversing the rotation of said spindles as they approach the stripping mechanism.

2. In a cotton picking machine, a wheeled frame, an endless belt mounted thereon, means for operating said belt, spaced series of cotton picking spindles projecting from said belt and adapted to pass through rows of cotton, means for rotating the spindles in one direction as they pass through said rows, cotton stripping mechanism for removing the cotton from the spindles, said mechanism including a stripping chamber, spaced parallel plates arranged within the stripping chamber and between which the spindles pass, studs projecting from said plates, a spring pressed cover normally closing the top of said stripping chamber, a suction chamber in communication with the stripping chamber, a fan operating within the chamber, means for operating said fan incident to the movement of the machine over the ground, a discharge pipe leading from the suction chamber, and means for reversing the rotation of said spindles as they approach the stripping mechanism for the purpose specified.

In testimony whereof I affix my signature.

AMOS CLATEN VAUGHAN.